United States Patent Office 3,515,743
Patented June 2, 1970

---

3,515,743
1,2,3-TRICHLORO-2-CYANOPROPANE AND THE METHOD FOR PREPARING SAME
Masaaki Tsurushima, Itami, Hyogo, and Kozo Yatani, Ashiya, Hyogo, Japan, assignors to Takeda Chemical Industries, Ltd., Osaka, Japan
No Drawing. Filed May 15, 1967, Ser. No. 638,616
Claims priority, application Japan, May 14, 1966, 41/30,794
Int. Cl. C07c *121/00, 121/16*
U.S. Cl. 260—465.7  1 Claim

ABSTRACT OF THE DISCLOSURE

The invention provides the compound 1,2,3-trichloro-2-cyanopropane and the process for producing such compound. The process comprises reacting chlorine gas with 3-chloro-2-cyanopropene under conditions of irradiation to produce the objective compound.

---

This invention relates to a novel compound which is of great value for use as an intermediate in the production of various kinds of chemical compounds.

More specifically, this invention relates to the novel compound 1,2,3-trichloro-2-cyanopropane and to a process for preparing the compound which process comprises allowing chlorine gas to react with 3-chloro-2-cyanopropene under conditions of irradiation of rays having a wave-length of not longer than that of visible rays.

Extensive studies by the present inventors have resulted in the new finding that a novel 1,2,3-trichloro-2-cyanopropane which is useful as an intermediate in the production of many kinds of chemical compounds can be produced in a high yield by allowing chlorine gas to act upon 3-chloro-2-cyanopropene under conditions of irradiation.

The object of the present invention is to provide the novel 1,2,3-trichloro-2-cyanopropane useful as an intermediate in the production of many kinds of chemical compounds, for example, medicines, germicides, pesticides, etc.

The objective novel 1,2,3-trichloro-2-cyanopropane of the present invention is represented by the following formula:

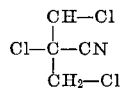

Another object of the present invention is to provide a method for the preparation of the novel compound.

Other objects will become apparent from the following descriptions and working examples.

The method of the present invention is carried out by contacting chlorine gas with 3-chloro-2-cyanopropene under conditions of irradiation of rays having a wave-length of not longer than that of visible rays, the contact being advantageously conducted by blowing the chlorine gas into a solution of 3-chloro-2-cyanopropene. The reaction may be conducted with or without a solvent, but the use of an inert solvent is desirable.

Kinds of solvents employed will vary over a wide range and the criterion is that the solvent used does not adversely effect the desired reaction, and may be suitably selected depending on the reaction conditions.

As solvents employable in the present method, there are exemplified by halogenated hydrocarbons such as tetrachloromethane, trichloromethane, etc., ethers such as diethyl ether, tetrahydrofuran, etc., nitriles such as propionitrile, acetonitrile, etc., aliphatic hydrocarbons such as hexane.

Additionally, objective 1,2,3 - trichloro-2-cyanopropane may be used as a solvent for the reaction.

The chlorine gas need not be used in a pure state, but crude chlorine gas can also attain the purpose of the present invention. The chlorine utilized in the reaction process should be within the molar ratio of 1.7 to 8.5 per mole of the propene reactant.

The reaction of the present method may proceed in a dark place, but conditions of irradiation are necessarily required in order to produce the objective compound in a commercially profitable high yield.

The irradiation may be carried out in a conventional manner with rays having a wave-length of not longer than that of visible rays, and generally, a ray having a wave-length of from 1000 A. to 7000 A., more desirably about 3000 A. to about 5000 A.

Practically, use is made of rays such as sunlight, or light of incandescent lamp, fluorescent lamp, carbon arc-light, concentration arc-light, hydrogen arc-light, xenon-lamp, mercury-lamp (low or high-pressure) or cadmium-lamp etc.

Among the sources of light, the mercury-lamp is preferable and especially high-pressure mercury-lamp gives the best result.

The reaction temperature is preferably from 0° C. to up to about 100° C. However, in most cases, it is preferable to conduct the reaction not higher than about 30° C. in view of the suppression of undesirable side-reactions at such temperatures.

The reaction may be continued until desired yield of the objective compound is obtained. Generally, a reaction time of from a few to several tens of hours is satisfactory.

Thus the objective 1,2,3-trichloro-2-cyanopropane is produced in a high yield.

The objective compound is useful as an intermediate in the production of vitamin $B_1$. Specifically, the 1,2,3-trichloro-2-cyanopropane is used to form 2-alkyl-4-amino-5-acylamidomethyl pyrimidine by reacting the former with an amidine, followed by hydrolysis. The thus produced pyrimidine is used to form vitamin $B_1$ or its related compounds in the conventional manner known to those skilled in the art.

The following examples represent presently-preferred illustrative embodiments of the invention.

In the following description, parts means "parts by weight."

EXAMPLE 1

To a mixture of 20.3 parts of 3-chloro-2-cyanopropene and 70 parts of chloroform was introduced chlorine gas at a rate of 0.1 part/minute at 30° C. under irradiation of the fluorescent lamp (30 watts) for 10 hours with agitation.

The reaction mixture was subjected to distillation under reduced pressure to obtain a fraction having 24.5 parts by weight of boiling range of 79–80° C./10 mm. Hg as 1,2,3-trichloro-2-cyanopropane which melts at 23° C. as well as 5.1 parts by weight of boiling range of 64–66° C./20 mm. Hg as unreacted starting material. Yield 71%.

*Elementary analysis.*—Calculated for $C_4H_4NCl_3$ (percent): C, 27.86; H, 2.34; N, 8.12; Cl. 61.18. Found (percent): C. 28.04; H, 2.22; N, 7.93; Cl, 61.78.

Nuclear magnetic resonance (in tetrachloromethane) $\tau$:4.06 (at 60 megacycles).

EXAMPLE 2

To a mixture of 20.3 parts by weight of 3-chloro-2-cyanopropene and 70 parts by weight of tetrachloromethane in a transparent quartz flask was introduced chlorine gas at a rate of 0.1 part/minute at 20–30° C. under irradiation of high-pressure mercury lamp (400 watts, 3500 A.–4000 A.) for 4 hours with agitation.

The reaction mixture was subjected to distillation under reduced pressure to obtain a fraction having 30.4 parts by weight of boiling range of 79–80° C./10 mm. Hg as 1,2,3-trichloro-2-cyanopropane which as well as 1.3 parts by weight of boiling range of 64–66° C./20 mm. Hg as unreacted starting material. Yield 88%.

EXAMPLE 3

To 20.3 parts by weight of 3-chloro-2-cyanopropene in a transparent quartz flask was introduced chlorine gas in a rate of 0.1 part/minute at 10–20° C. under irradiation of high-pressure mercury lamp (400 watts, 3500 A.–4000 A.) for 4 hours with agitation.

The reaction mixture was subjected to distillation under reduced pressure to obtain a fraction having 17.6 parts by weight of boiling range of 79–80° C./1 mm. Hg as 1,2,3-trichloro-2-cyanopropane as well as 1,2 parts by weight of boiling range of 64–66° C./20 mm. Hg as unreacted starting material. Yield 51%.

On the other hand, as clearly shown in the following experiment, the objective 1,2,3-trichloro-2-cyanopropane is produced only in a lower yield, when the reaction is carried out in a dark place.

To a mixture of 20.3 parts by weight of 3-chloro-2-cyanopropene and 70 parts by weight of tetrachloromethane was introduced chlorine gas at a rate of 0.1 part/minute at 75–80° C. in a dark place for 20 hours with agitation.

The reaction mixture was subjected to distillation under reduced pressure to collect a fraction having 14.6 parts by weight of boiling range of 64–66° C./20 mm. Hg as unreacted starting material and 6.2 parts by weight of 79–80° C./10 mm. Hg as 1,2,3-trichloro-2-cyanopropane. Yield 18%.

Having thus disclosed the invention what is claimed is:
1. 1,2,3-trichloro-2-cyanopropane.

References Cited

UNITED STATES PATENTS

| | | | |
|---|---|---|---|
| 2,379,097 | 6/1945 | Niederhauser et al. | 260—465.7 |
| 2,390,470 | 12/1945 | Sumner | 204—158 |
| 3,401,105 | 9/1968 | Anyos et al. | 204—158 |

JOSEPH PAUL BRUST, Primary Examiner

U.S. Cl. X.R.

204—158; 260—256.4